United States Patent
Patwardhan et al.

(10) Patent No.: US 10,409,691 B1
(45) Date of Patent: Sep. 10, 2019

(54) LINKING BACKUP FILES BASED ON DATA PARTITIONS

(71) Applicant: EMC IP Holding Company LLC, Hopkinton, MA (US)

(72) Inventors: Kedar Patwardhan, Irvine, CA (US); Arash Sepasi Ahoei, Irvine, CA (US); Mathew Sprehn, Irvine, CA (US); Michael Smolenski, Sparks, NV (US); Devon Kemp, Laguna Hills, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 378 days.

(21) Appl. No.: 15/283,583

(22) Filed: Oct. 3, 2016

(51) Int. Cl.
*G06F 7/00* (2006.01)
*G06F 17/00* (2019.01)
*G06F 11/14* (2006.01)

(52) U.S. Cl.
CPC ...... *G06F 11/1451* (2013.01); *G06F 11/1469* (2013.01); *G06F 2201/80* (2013.01); *G06F 2201/805* (2013.01); *G06F 2201/82* (2013.01); *G06F 2201/84* (2013.01)

(58) Field of Classification Search
CPC ............ G06F 11/1451; G06F 11/1469; G06F 2201/80; G06F 2201/805; G06F 2201/82; G06F 2201/84
See application file for complete search history.

(56) References Cited

U.S. PATENT DOCUMENTS

| | | | | |
|---|---|---|---|---|
| 2014/0214769 | A1* | 7/2014 | Takayama | G06F 11/1451 707/645 |
| 2014/0310245 | A1* | 10/2014 | Novick | G06F 17/30575 707/645 |
| 2017/0308420 | A1* | 10/2017 | Korotaev | G06F 11/1451 |
| 2017/0357550 | A1* | 12/2017 | Jain | G06F 11/1451 |

* cited by examiner

*Primary Examiner* — Azam M Cheema
(74) *Attorney, Agent, or Firm* — Dergosits & Noah LLP; Todd A. Noah

(57) ABSTRACT

A system identifies a first partition and another partition in a full backup created at a first time for a dataset. The system identifies a revision of the first partition in a first incremental backup created at a second time for the dataset, and links the first incremental backup to the full backup based on the first partition and the revision of the first partition. The system identifies a revision of the other partition in another incremental backup created at a third time for the dataset, and links the other incremental backup to the full backup based on the other partition and the revision of the other partition. The system restores the other partition in the dataset based on the link from the other incremental backup to the full backup, in response to receiving a request to restore the other partition in the dataset.

17 Claims, 5 Drawing Sheets

LINKING BACKUP FILES BASED ON DATA PARTITIONS

BACKGROUND

If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and instructs the backup/restore application to execute a restore operation to restore a copy of the corresponding backup files for that state to the data object.

A data object may be stored on a storage array, which is a disk storage system that includes multiple disk drives. Unlike a disk enclosure, a storage array has cache memory and advanced functionality, such as virtualization and Redundant Array of Independent Disks (RAID). A data protection administrator may manage a backup/restore application to create backups files of data objects and store the backup files of data objects on multiple storage arrays.

When a backup/restore application creates an incremental backup file for a data object or dataset, the backup/restore application only backs up data that is new or changed in the dataset since the backup/restore application created the most recent previous backup file. The backup/restore application identifies the most recently created backup file to enable the combination of the incremental backup file and the most recently created backup file, possibly along with other backup files created for the data set, into a full copy of the backed up dataset. The incremental backup file may be a partial incremental backup file that includes only a subset of the overall dataset, such that the incremental backup file is not a new version of the entirety of the most recent previous backup file, but is only a subset thereof. For example, after a backup/restore application creates an initial full backup file of data stored by two volumes A and B, the backup/restore application subsequently creates a partial incremental backup file that includes only data that changed in volume B following the creation of the initial full backup file.

DETAILED DESCRIPTION

Typically, a backup/restore application may assume that an incremental backup file is a follow-up backup file that is based on the most recently created backup file, due to the chronological order in which the backup/restore application created these backup files. However, an incremental backup file may not be a follow-up backup file that is based on the most recently created backup file if the incremental backup file is a partial incremental backup file.

Figure 1:
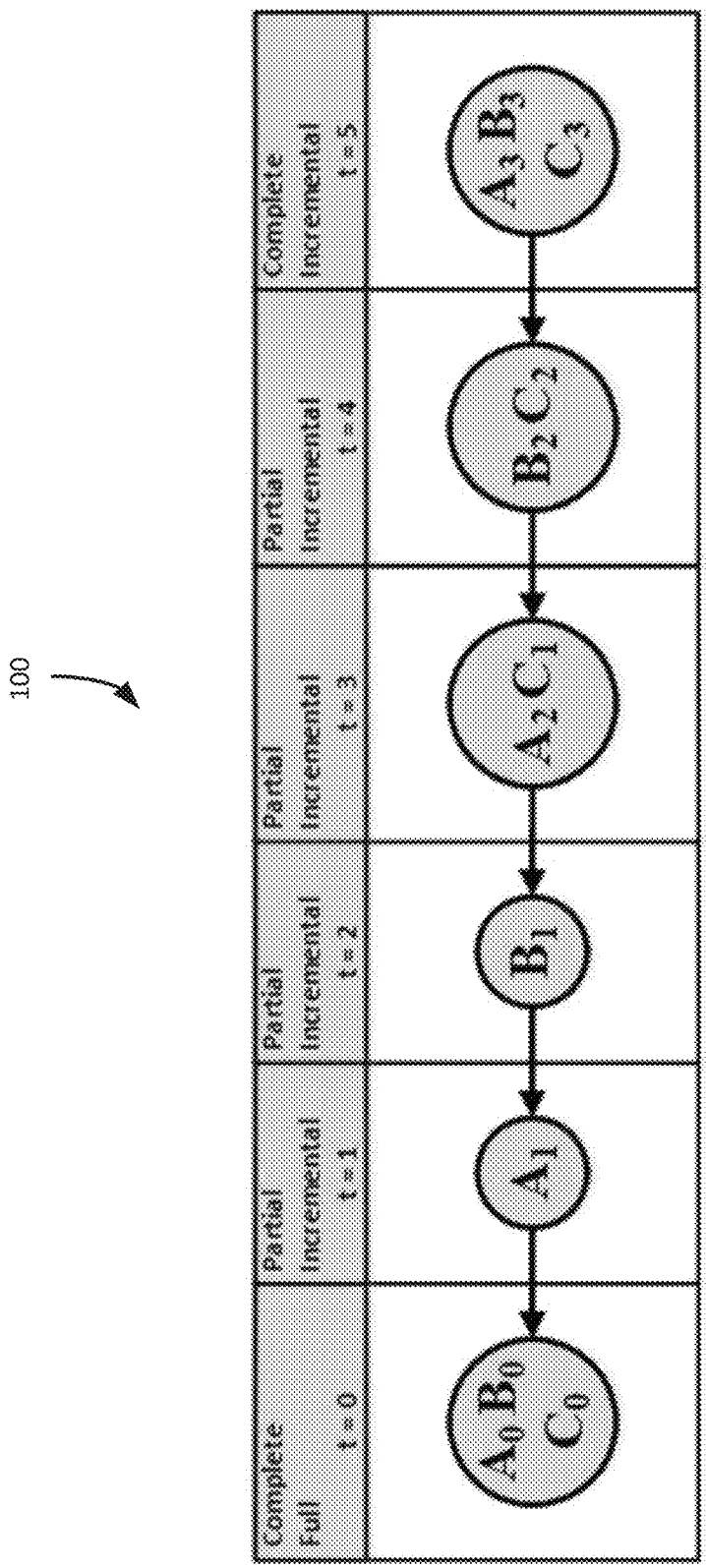
FIG. 1 illustrates a block diagram of example blocks in which the prior art erroneously links backup files.

FIG. 1 illustrates a diagram of blocks 100 for such an example, in which a conventional backup/restore application erroneously links backup files. At time t=0, the backup/restore application creates an initial full backup file that includes the initial versions of the data elements $A_0$ and $B_0$ in a dataset. At time t=1, the backup/restore application creates a first partial incremental backup file that includes only the data element $A_1$, which is the data that is new or changed for the data element $A_0$ since the initial full backup file was created. Since the backup/restore application assumes that the first partial incremental backup file is a follow-up backup file that is based on the most recently created backup file, the backup/restore application links the partial incremental backup file that includes only data element $A_1$ to the initial full backup file that includes the data elements $A_0$ and $B_0$. At time t=2, the backup/restore application creates a second partial incremental backup file that includes only the data element $B_1$, which is the data that is new or changed for the data element $B_0$ since the initial full backup file was created. Since the backup/restore application assumes that the second partial incremental backup file is a follow-up backup file that is based on the most recently created backup file, the backup/restore application links the second partial incremental backup file that includes only the data element $B_1$ to the first partial incremental backup file that includes only the data element $A_1$. However, the partial incremental backup file that includes only the data element $A_1$ does not include any data that is the basis for the data element $B_1$. By erroneously linking the second partial incremental backup file that includes only the data element $B_1$ to the first partial incremental backup file that includes only the data element $A_1$, conventional backup/restore applications may create data inconsistencies and/or adversely affect the performance of data de-duplication.

Data inconsistencies may occur when a system user requests the restoration of only one data element and the prior art backup/restore application bases the requested restoration on incorrect links. An example of incorrect links for the restoration of only data element B are the link from the second partial incremental backup file that includes only the data element $B_1$ to the first partial incremental backup file that includes only the data element $A_1$ and the link from the first partial incremental backup file to the initial full backup file that includes the data elements $A_0$ and $B_0$. For this example, basing a restoration on an incorrect link may result in restoring both the data element A and the data element B, even though the user requested the restoration of only the data element B. The user may have specifically requested the restoration of only the data element B because the user made additional changes to the data element A which have yet to be backed up, but the restoration of the data element A based on the erroneous link results in the loss of these newest changes to the data element A.

Data de-duplication may be adversely affected when a backup/restore application uses the most recent previous backup file as the basis for de-duplicating an incremental backup file. For example, a typical backup/restore application uses the incorrect link from the second partial incremental backup file that includes only the data element $B_1$ to the first partial incremental backup file that includes only the data element $A_1$ to conclude that no de-duplication is possible for the second partial incremental backup file that includes only the data element $B_1$. However, the initial full backup file has the data element $B_0$ that could have been used to effectively de-duplicate the second partial incremental backup file that includes only the data element $B_1$, but the erroneous linking prevented this de-duplication.

Embodiments herein link backup files based on data partitions. A system, for example, identifies a first data partition and another data partition in a full backup file created at a first time for a dataset. The system identifies a revision of the first data partition in a first incremental backup file created at a second time for the dataset, and links the first incremental backup file to the full backup file based on the first data partition and the revision of the first data partition. The system identifies a revision of the other data partition in another incremental backup file created at a third time for the dataset, and links the other incremental backup file to the full backup file based on the other data partition and the revision of the other data partition. The system restores the other data partition in the dataset based on the link from the other incremental backup file to the full backup file, in response to receiving a request to restore the other data partition in the dataset.

Figure 2:
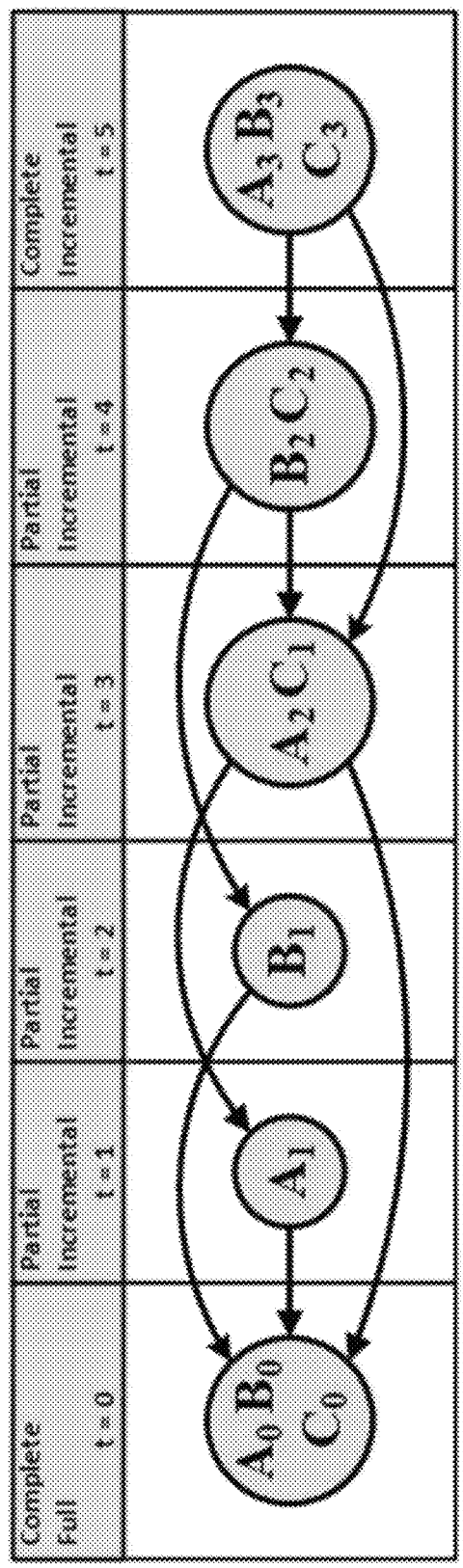
FIG. 2 illustrates a block diagram of example blocks for linking backup files based on data partitions, under an embodiment.

FIG. 2 illustrates a diagram of example blocks 200 for linking backup files based on data partitions, under an embodiment. In this example, a backup/restore application identifies data partition A and data partition B in an initial full backup file created at time t=0 for a dataset. Then the backup/restore application identifies a revision of the data partition A in a first incremental backup file created at time t=1, and links the first incremental backup file that includes only the revision of the data partition A to the initial full backup file that includes the data partition A and the data partition B. Having linked the backup file created at time t=1, the backup/restore application identifies a revision of the data partition B in a second incremental backup file created at time t=2, and links the second incremental backup file that includes only the revision of the data partition B to the initial full backup file that includes the data partition A and the data partition B.

After linking the backup file created at time t=2, a system user requests the restoration of only the data partition B, and the backup/restore application restores only the requested data partition B based on the link from the second incremental backup file that includes only the revision of the data partition B to the initial full backup file that includes the data partition A and the data partition B. After each backup file is created, the backup/restore application of the present disclosure identifies any data partitions and correctly links the current backup file based on any identified data partitions, which also enables the correct linking of subsequently created backup files. Therefore, the backup/restore application identifies data partitions to correctly link the second incremental backup file to the initial full backup file, thereby enabling the correct restoration based on the second incremental backup file, and also enabling the correct de-duplication of the second incremental backup file.

Figure 3:
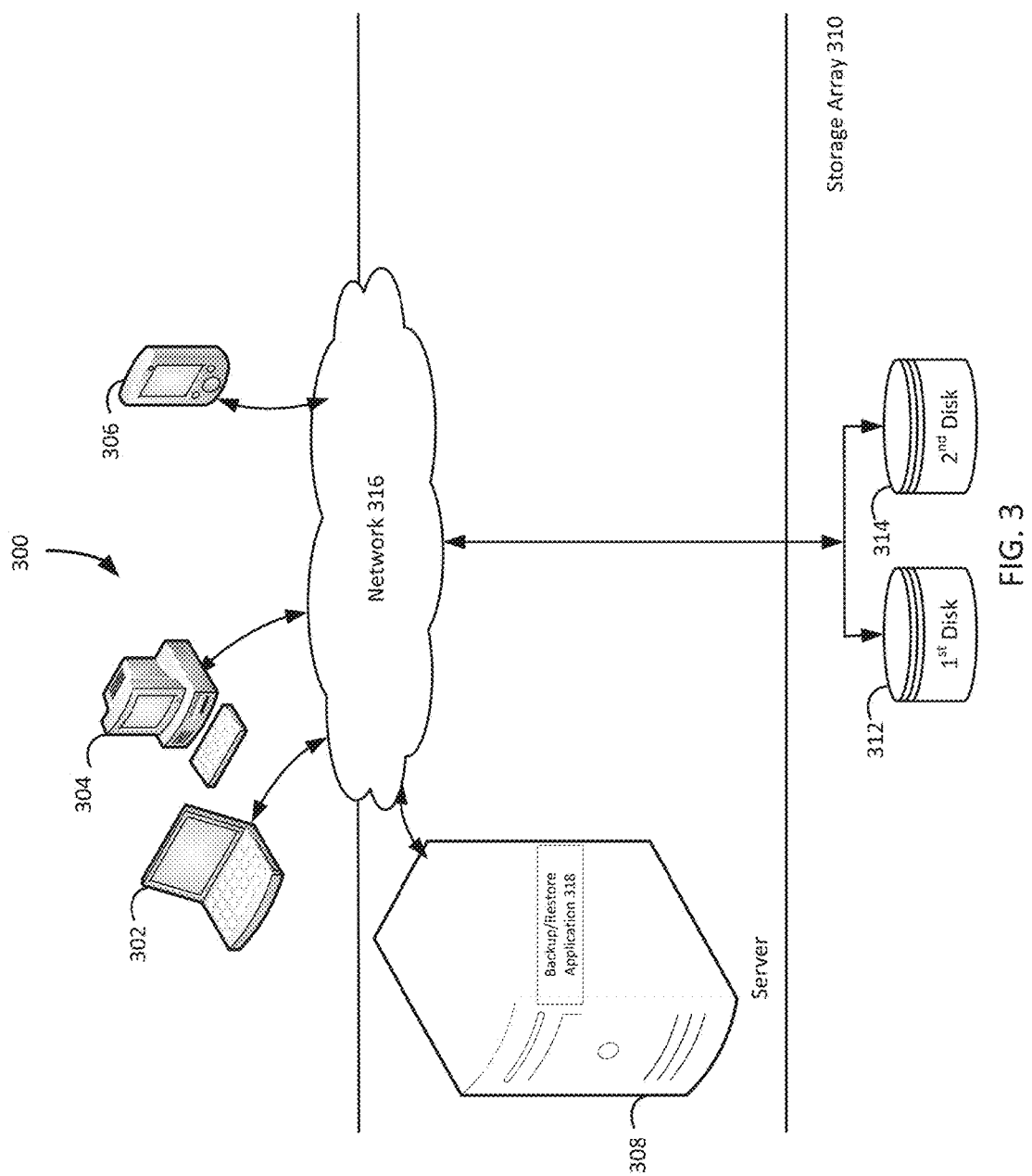
FIG. 3 illustrates a block diagram of an example system for linking backup files based on data partitions, under an embodiment.

FIG. 3 illustrates a diagram of a system 300 for linking backup files based on data partitions, under an embodiment. As shown in FIG. 3, the system 300 may illustrate a cloud computing environment in which data, applications, services, and other resources are stored and delivered through shared data-centers and appear as a single point of access for the users. The system 300 may also represent any other type of distributed computer network environment in which servers control the storage and distribution of resources and services for different client users.

In an embodiment, the system 300 represents a cloud computing system that includes a first client 302, a second client 304, and a third client 306; and a server 308, and a storage array 310 that may be provided by a hosting company. Although FIG. 3 depicts the first client 302 as a laptop computer 302, the second client 304 as a personal computer 304, and the third client 306 as a personal digital assistant 306, each of the clients 302-306 may be any type of computer, such as a server. The storage array 310 includes a first disk 312 and a second disk 314. The clients 302-306, the server 308, and the storage array 310 communicate via a network 316. Although FIG. 3 depicts the system 300 with three clients 302-306, one server 308, one storage array 310, two disks 312-314, and one network 316, the system 300 may include any number of clients 302-306, any number of servers 308, any number of storage arrays 310, any number of disks 312-314, and any number of networks 316. The clients 302-306 and the server 308 may each be substantially similar to the system 500 depicted in FIG. 5 and described below.

The server 308, which may be referred to as a backup server 308, includes a backup/restore application 318 that may create backup files of data objects for the clients 302-306, and execute a rollback based on the backup files stored on the storage array 310, which may be stored using the VHDx format for Microsoft Windows®. The backup/restore application 318 may provide centralized administration, such as scheduling, monitoring, and managing backup operations and backup files. The backup/restore application 318 can enable the storing of backup operation schedules, client policies, and client configurations. The backup/restore application 318 may provide a unique interface to the clients 302-306 during login, and assist the backup server 308 in authenticating and registering the clients 302-306. The backup/restore application 318 can send backup/restore work orders to the clients 302-306, which may receive and process the work orders to start a backup or restore operation. The backup/restore application 318 maintains a local database of all processes that execute on the backup server 308. The backup/restore application 318 executes server-side processes for a system administrator's graphical management console, which may enable the system administrator to use command line interface tools for queries. For example, a system administrator identifies the clients 302-306 registered with the backup server 308.

Although FIG. 3 depicts the backup/restore application 318 residing completely on the backup server 308, the backup/restore application 318 may reside in any combination of partially on the backup server 308 and partially on the clients 302-306, such as by residing as data management applications on the clients 302-306. Even though the following paragraphs describe EMC Corporation's Avamar® backup/restore application and EMC Corporation's NetWorker® backup/restore application as examples of the backup/restore application 318, the backup/restore application 318 may be any other backup/restore application which provides the backup/restore functionalities described in the Background section.

The backup/restore application 318 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems can be deployed in an integrated solution with EMC Corporation's Data Domain® systems for high-speed backup and recovery of specific data types.

The backup/restore application 318 may be an EMC Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

The system 300 identifies a first data partition and another data partition in a full backup file created at a first time for a dataset. The system 300 links backup files based on such identified data partitions. For example, the backup/restore application 318 identifies the data partition A, the data partition B, and the data partition C in the initial full backup file that was created at time t=0 for a dataset, as depicted in FIG. 2. Although this example describes the backup/restore application 318 identifying three data partitions in a full backup file, the backup/restore application 318 can identify any number of data partitions in a full backup file. Having identified any data partitions in a backup file, the system 300 tags the backup file with any identified data partitions. For example, the backup/restore application 318 tags the full backup file with the data partition A, the data partition B, and the data partition C, which enables the backup/restore application 318 to link the full backup file with subsequent backup files that include revisions to the data partition A, revisions to the data partition B, and/or revisions to the data partition C.

A dataset can be a collection or a group of information that is backed up as a unit, such as the information for a computer or a network of computers. A data partition can be a subgroup of information that is backed up as a sub unit, such as a disk drive, a directory, a database table, or a virtual machine associated with a computer. Identifying a data partition can be establishing or indicating what a grouping of information is, such as disk drives "A:", "B:", and "C:", directories "/foo" and "foo2", database tables' global unique identifiers, or virtual machines VMDK1 and VMDK2. A full backup file for a dataset can be a record of all the information needed to restore the dataset to a state at a point in time when the data was recorded. A time can be an event in a sequence of events that are measured by hours and minutes, such that a first time that occurs chronologically before a second time, the second time that occurs chronologically before a third time, the third time that occurs chronologically before a fourth time, the fourth time that occurs chronologically before a fifth time, and the fifth time that occurs chronologically before a sixth time, etc.

After identifying data partitions in the full backup file, the system 300 identifies a revision of the first data partition in a first incremental backup file created at a second time for the dataset. The system 300 links backup files based on such an identified data partition. For example, the backup/restore application 318 identifies revision 1 of the data partition A in the first incremental backup file that was created at time t=1, as depicted in FIG. 2. Having identified any data partitions in a backup file, the system 300 tags the backup file with any identified data partitions. For example, the backup/restore application 318 tags the first incremental backup file with the data partition A, which enables the backup/restore application 318 to link the first incremental backup file with previous and subsequent backup files that include the data partition A and/or revisions of the data partition A.

The system 300, after the current backup file is tagged with a data partition, identifies the most recent previous backup file that is tagged with the same data partition for linking with the current backup file. For example, after tagging the first incremental backup file with the data partition A, the backup/restore application 318 identifies the full backup file as the most recent previous backup file that is tagged with the same data partition A for linking with the first incremental backup file. A revision of a data partition can be any addition, deletion, or modification of information associated with a grouping of information, such as the insertion of new data into a data table. An incremental backup file for a dataset can be a record of the data that is new or changed in the dataset since a backup/restore application created the most recent previous backup file.

Once the system 300 identifies the corresponding data partitions, the system 300 links the first incremental backup file to the full backup file based on the first data partition and the revision of the first data partition. For example, the backup/restore application 318 links the first incremental backup file that is tagged with the data partition A to the initial full backup file that is tagged with the data partition A and the data partition B. By correctly linking the first incremental backup file based on the revision of the first data partition, the backup/restore application 318 enables the correct linking of subsequently created backup files, such as the subsequently created second incremental backup file. Linking one backup file to another backup file can be making or forming a connection or relationship between the backup files. A link between one backup file and another backup file can be the connection or relationship between the backup files.

The backup/restore application 318 can identify data partitions and link backup files based on the identified data partitions in parallel with other backup file preparation and creation processes for the dataset. The backup/restore application 318 can link backup files based on identified data partitions whether or not the backup files will be combined together via a synthetic backup operation, and whether or not the synthetic full backup operation is a rolling synthetic full backup operation or an on-demand synthetic full backup operation.

The system 300 can de-duplicate the current incremental backup file based on the link(s) from the current incremental backup file to any other backup file(s). For example, the backup/restore application 318 de-duplicates the first incremental backup file that includes revision 1 of the data partition A based on the link from the first incremental backup file that includes revision 1 of the data partition A to the initial full backup file that includes the data partition A, the data partition B, and the data partition C.

Then, the system 300 identifies a revision of the other data partition in another incremental backup file created at a third time for the dataset. The system 300 links backup files based on such an identified data partition. For example, the backup/restore application 318 identifies revision 1 of the data partition B in the second incremental backup file that was created at time t=2, as depicted in FIG. 2. Even though this example describes the backup/restore application 318 identifying revision 1 of the data partition B in the second incremental backup file, the backup/restore application 318 can identify any revision of any data partition in any incremental backup file. Next, the system 300 tags the backup file with any identified data partitions. For example, the backup/restore application 318 tags the second incremental backup file with the data partition B, which enables the backup/restore application 318 to link the second incremental backup file with previous and subsequent backup files that include the data partition B and/or revisions of the data partition B. Granting that this example describes the backup/restore application 318 tagging the second incremental backup file to enable linking the second incremental backup file with previous and subsequent backup files, the backup/restore application 318 can tag any incremental backup file to enable linking the incremental backup file with previous and subsequent backup files.

Consequently, the system 300 identifies the most recent previous backup file that is tagged with the same data partition for linking with the current backup file. For example, after tagging the second incremental backup file with the data partition B, the backup/restore application 318 identifies the full backup file as the most recent previous backup file that is tagged with the same data partition B for linking with the second incremental backup file. Though this example describes the backup/restore application 318 identifying the full backup file as the most recent previous backup file that is tagged with the same data partition for linking with the second incremental backup file, the backup/restore application 318 can identify the full backup file as the most recent previous backup file that is tagged with the same data partition for linking with any incremental backup file. Having identified corresponding data partitions, the system 300 links the other incremental backup file to the full backup file based on the other data partition and the revision of the other data partition. For example, the backup/restore application 318 links the second incremental backup file that includes revision 1 of the data partition B to the initial full backup file that includes the data partition A, the data partition B, and the data partition C. Whereas this example describes the backup/restore application 318 linking the second incremental backup file to the initial full backup file, the backup/restore application 318 can link any incremental backup file to the initial full backup file. By correctly linking the second incremental backup file based on the revision of the second data partition, the backup/restore application 318 enables the correct linking of subsequently created backup files.

The system 300 can de-duplicate the current incremental backup file based on the link(s) from the current incremental backup file to any other backup file(s). For example, the backup/restore application 318 de-duplicates the second incremental backup file that includes revision 1 of the data partition B based on the link from the second incremental backup file that includes revision 1 of the data partition B to the initial full backup file that includes the data partition A, the data partition B, and the data partition C. While this example describes the backup/restore application 318 de-duplicating the second incremental backup file based on the link from the second incremental backup file to the initial full backup file, the backup/restore application 318 can de-duplicate any incremental backup file based on the link from the incremental backup file to the initial full backup file.

Subsequently, the system 300 receives a request to restore the other data partition in the dataset. For example, when a data protection administrator decides to return only the data partition B to a previous state, the data protection administrator specifies the desired previous state by identifying the desired point in time at t=2 when the data partition B was in this state, and requests the backup/restore application 318 to execute a restore operation to restore a copy of the corresponding backup files for that state of the data partition B. Restoring a data partition in a dataset can be returning the data partition to a state in time at which data was backed up for the data partition. The system 300 restores the other data partition in the dataset based on the link from the other incremental backup file to the full backup file, in response to the request to restore the other data partition. For example, the backup/restore application 318 restores only the requested data partition B based on the link from the second incremental backup file that includes revision 1 of the data partition B to the initial full backup file that includes the data partition A and the data partition B. Although this example describes the backup/restore application 318 restoring only the requested data partition based on the link from the second incremental backup file to the initial full backup file, the backup/restore application 318 can restore only the requested data partition based on the link from any incremental backup file to the initial full backup file. In contrast to the existing backup/restore applications that would erroneously link the second incremental backup file to the first incremental backup file, the backup/restore application 318 identifies data partitions to correctly link the second incremental backup file to the initial full backup file, thereby enabling the correct restoration based on the second incremental backup file, and also enabling the correct de-duplication of the second incremental backup file.

The backup/restore application 318 processes the backup files that are created at time t=3 through t=5 similar to the processing described above of the backup files created at time t=0 through t=2. The backup/restore application 318 begins processing the third incremental backup file that was created at time t=3 by identifying revision 2 of the data partition A and revision 1 of the data partition C in this backup file, and tagging this backup file with the data partitions A and C. Then the backup/restore application 318 completes the processing of the third incremental backup file by identifying the first incremental backup file as the most recent previous backup file that is tagged with the data partition A, identifying the full backup file as the most recent previous backup file that is tagged with the data partition C, and linking the third incremental backup file to the first incremental backup file and the full backup file.

Then the backup/restore application 318 initiates processing of the fourth incremental backup file created at time t=4 by identifying revision 2 of the data partition B and revision 2 of the data partition C in this backup file, and tagging this backup file with the data partitions B and C. Then the backup/restore application 318 finishes the processing of the fourth incremental backup file by identifying the second incremental backup file as the most recent previous backup file that is tagged with the data partition B, identifying the third incremental backup file as the most recent previous backup file that is tagged with the data partition C, and linking the fourth incremental backup file to the second incremental backup file and the third incremental backup file.

Next, the backup/restore application 318 starts processing the fifth incremental backup file that was created at time t=5 by identifying revision 3 of the data partition A, revision 3 of the data partition B, and revision 3 of the data partition C in this backup file, and tagging this backup file with the data partitions A, B, and C. Then the backup/restore application 318 identifies the third incremental backup file as the most recent previous backup file that is tagged with the data partition A, the fourth incremental backup file as the most recent previous backup file that is tagged with the data partition B, and the fourth incremental backup file as the most recent previous backup file that is tagged with the same data partition C. Consequently, the backup/restore application 318 concludes the processing of the fifth incremental backup file by linking this backup file to the third incremental backup file and the fourth incremental backup file.

Figure 4:
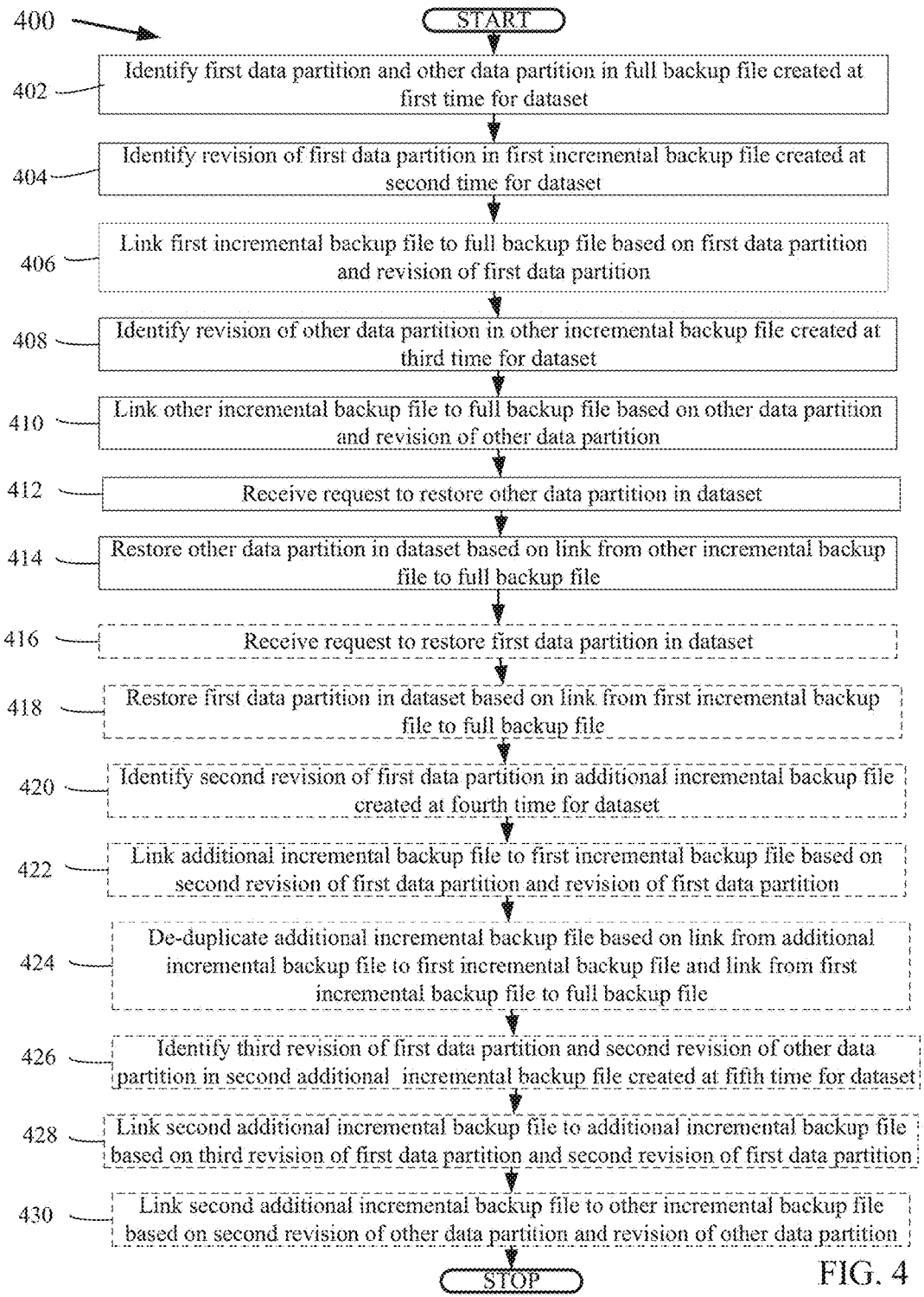
FIG. 4 is a flowchart that illustrates a method of linking backup files based on data partitions, under an embodiment.

FIG. 4 is a flowchart that illustrates a method for linking backup files based on data partitions, under an embodiment. Flowchart 400 illustrates method acts illustrated as flowchart blocks for certain steps involved in and/or between the clients 302-306 and/or the server 308 of FIG. 3 and also involving the blocks 200 of FIG. 2.

A first data partition and another data partition are identified in a full backup file created at a first time for a dataset, block 402. For example and without limitation, this can include the backup/restore application 318 identifying the data partition A and the data partition B in the initial full backup file that was created at time t=0 for a dataset.

A revision of the first data partition is identified in a first incremental backup file created at a second time for the dataset, block 404. By way of example and without limitation, this can include the backup/restore application 318 identifying revision 1 of the data partition A in the first incremental backup file that was created at time t=1.

The first incremental backup file is linked to the full backup file based on the first data partition and the revision of the first data partition, block 406. In embodiments, this can include the backup/restore application 318 linking the first incremental backup file that includes revision 1 of the data partition A to the initial full backup file that includes the data partition A and the data partition B.

A revision of the other data partition is identified in another incremental backup file created at a third time for the dataset, block 408. For example and without limitation, this can include the backup/restore application 318 identifying revision 1 of the data partition B in the second incremental backup file that was created at time t=2.

The other incremental backup file is linked to the full backup file based on the other data partition and the revision of the other data partition, block 410. By way of example and without limitation, this can include the backup/restore application 318 linking the second incremental backup file that includes revision 1 of the data partition B to the initial full backup file that includes the data partition A and the data partition B.

A request to restore the other data partition in the dataset is received, block 412. In embodiments, this can include the backup/restore application 318 receiving a system user's request to restore only the data partition B.

The other data partition in the dataset is restored based on the link from the other incremental backup file to the full backup file, block 414. For example and without limitation, this can include the backup/restore application 318 restoring only the requested data partition B based on the link from the second incremental backup file that includes revision 1 of the data partition B to the initial full backup file that includes the data partition A and the data partition B.

A request to restore the first data partition in the dataset is optionally received, block 416. By way of example and without limitation, this can include the backup/restore application 318 receiving a system user's request to restore only the data partition A.

The first data partition in the dataset is optionally restored based on the link from the first incremental backup file to the full backup file, block 418. In embodiments, this can include the backup/restore application 318 restoring only the requested data partition A based on the link from the first incremental backup file that includes revision 1 of the data partition A to the initial full backup file that includes the data partition A and the data partition B.

A second revision of the first data partition is optionally identified in an additional incremental backup file created at a fourth time for the dataset, block 420. For example and without limitation, this can include the backup/restore application 318 identifying revision 2 of the data partition A in the third incremental backup file that was created at time t=3. Even though this example describes the backup/restore application 318 identifying revision 2 of the data partition A in the third incremental backup file, the backup/restore application 318 can identify any revision of any data partition in any incremental backup file.

The additional incremental backup file is optionally linked to the first incremental backup file based on the second revision of the first data partition and the revision of the first data partition, block 422. By way of example and without limitation, this can include the backup/restore application 318 linking the third incremental backup file that includes revision 2 of the data partition A to the first incremental backup file that includes revision 1 of the data partition A. Granting that this example describes the backup/restore application 318 linking the third incremental backup file that includes revision 2 of the data partition A to the first incremental backup file that includes revision 1 of the data partition A, the backup/restore application 318 can link any incremental backup file that includes any revision of any data partition to any other incremental backup file that includes any revision of any data partition.

The additional incremental backup file is optionally de-duplicated based on the link from the additional incremental backup file to the first incremental backup file and the link from the first incremental backup file to the full backup file, block 424. In embodiments, this can include the backup/restore application 318 de-duplicating the third incremental backup file based on the link from the third incremental backup file to the first incremental backup file, and the link from the first incremental backup file to the initial full backup file. This example describes the backup/restore application 318 de-duplicating an incremental backup file based on one link from the incremental backup file to one other incremental backup file, and one link from the other incremental backup file to the initial full backup file. However, the backup/restore application 318 can de-duplicate an incremental backup file based on any number of links from the incremental backup file to any number of other incremental backup files, and any number of links from the other incremental backup files to any number of additional backup files.

A third revision of the first data partition and a second revision of the other data partition are optionally identified in a second additional incremental backup file created at a fifth time for the dataset, block 426. For example and without limitation, this can include the backup/restore application 318 identifying revision 3 of the data partition A and revision 3 of the data partition B in the incremental backup file that was created at time t=5. Though this example describes the backup/restore application 318 identifying two revisions of data partitions in a specific incremental backup file, the backup/restore application 318 can identify any number of revisions of data partitions in any incremental backup file.

The second additional incremental backup file is optionally linked to the additional incremental backup file based on the third revision of the first data partition and the second revision of the first data partition, block 428. By way of example and without limitation, this can include the backup/restore application 318 linking the incremental backup file that includes revision 3 of the data partition A to the third incremental backup file that includes revision 2 of the data partition A. Whereas this example describes the backup/restore application 318 linking a specific incremental backup file that includes revision 3 of the data partition A to the third incremental backup file that includes revision 2 of the data partition A, the backup/restore application 318 can link any incremental backup file that includes any revision of any data partition to any other incremental backup file that includes any revision of any data partition.

The second additional incremental backup file is optionally linked to the other incremental backup file based on the second revision of the other data partition and the revision of the other data partition, block 430. In embodiments, this can include the backup/restore application 318 linking the incremental backup file that includes revision 3 of the data partition B to the incremental backup file that includes revision 2 of the data partition B. While this example describes the backup/restore application 318 linking a specific incremental backup file that includes revision 3 of the data partition B to the particular incremental backup file that includes revision 2 of the data partition B, the backup/restore application 318 can link any incremental backup file that includes any revision of any data partition to any other incremental backup file that includes any revision of any data partition.

Although FIG. 4 depicts the blocks 402-430 occurring in a specific order, the blocks 402-438 may occur in another order. In other implementations, each of the blocks 402-430 may also be executed in combination with other blocks and/or some blocks may be divided into a different set of blocks.

Figure 5:
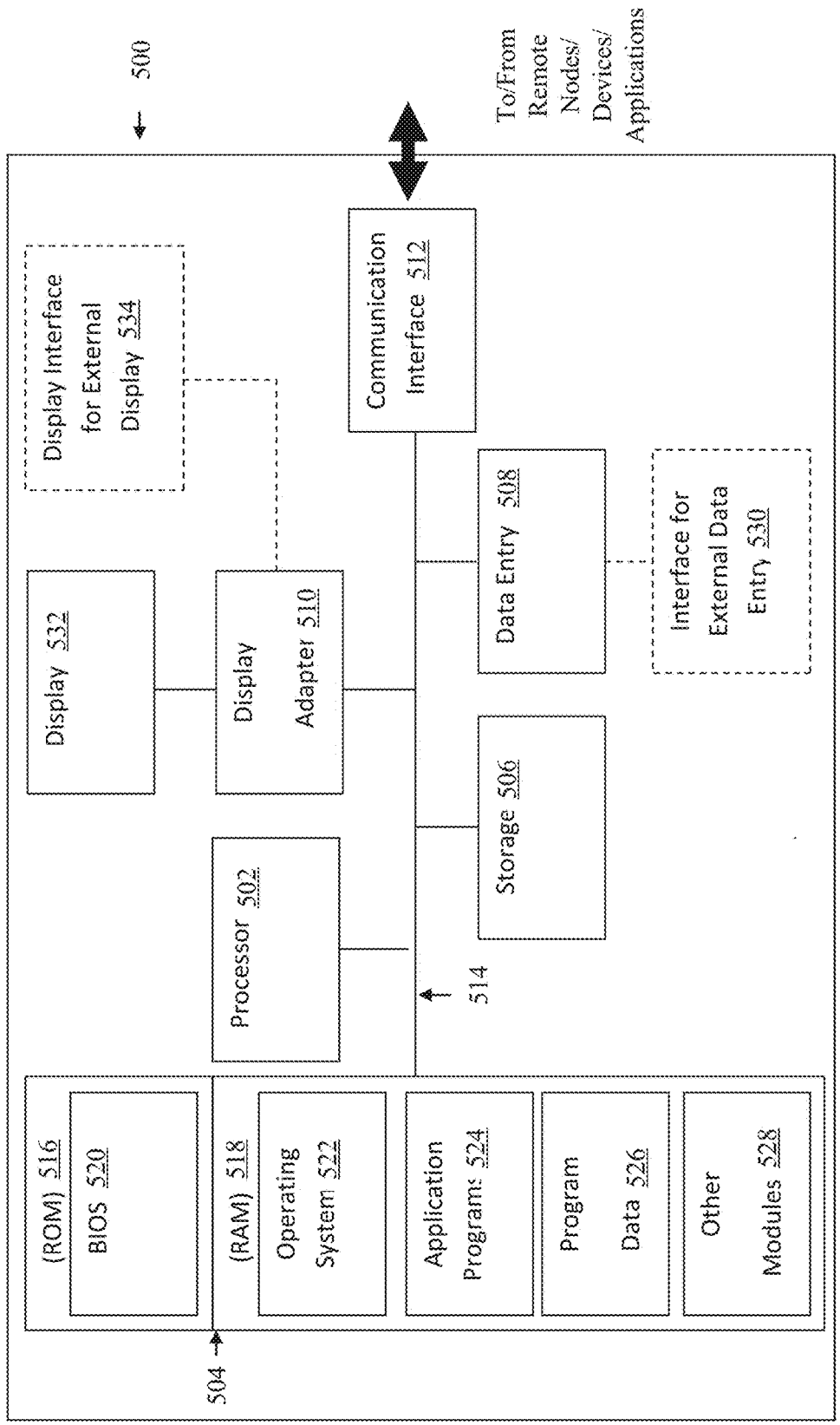
FIG. 5 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 5 may vary depending on the system implementation. With reference to FIG. 5, an exemplary system for implementing the subject matter disclosed herein includes a hardware device 500, including a processing unit 502, memory 504, storage 506, a data entry module 508, a display adapter 510, a communication interface 512, and a bus 514 that couples the elements 504-512 to the processing unit 502.

The bus 514 may comprise any type of bus architecture. Examples include a memory bus, a peripheral bus, a local bus, etc. The processing unit 502 is an instruction execution machine, apparatus, or device and may comprise a microprocessor, a digital signal processor, a graphics processing unit, an application specific integrated circuit (ASIC), a field programmable gate array (FPGA), etc. The processing unit 502 may be configured to execute program instructions stored in the memory 504 and/or the storage 506 and/or received via the data entry module 508.

The memory 504 may include read only memory (ROM) 516 and random access memory (RAM) 518. The memory 504 may be configured to store program instructions and data during operation of the hardware device 500. In various embodiments, the memory 504 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 504 may also include nonvolatile memory technologies such as nonvolatile flash RAM (NVRAM) or ROM. In some embodiments, it is contemplated that the memory 504 may include a combination of technologies such as the foregoing, as well as other technologies not specifically mentioned. When the subject matter is implemented in a computer system, a basic input/output system (BIOS) 520, containing the basic routines that help to transfer information between elements within the computer system, such as during start-up, is stored in the ROM 516.

The storage 506 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 500.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 506, the ROM 516 or the RAM 518, including an operating system 522, one or more applications programs 524, program data 526, and other program modules 528. A user may enter commands and information into the hardware device 500 through the data entry module 508. The data entry module 508 may include mechanisms such as a keyboard, a touch screen, a pointing device, etc. Other external input devices (not shown) are connected to the hardware device 500 via an external data entry interface 530. By way of example and not limitation, external input devices may include a microphone, joystick, game pad, satellite dish, scanner, or the like. In some embodiments, external input devices may include video or audio input devices such as a video camera, a still camera, etc. The data entry module 508 may be configured to receive input from one or more users of the hardware device 500 and to deliver such input to the processing unit 502 and/or the memory 504 via the bus 514.

A display 532 is also connected to the bus 514 via the display adapter 510. The display 532 may be configured to display output of the hardware device 500 to one or more users. In some embodiments, a given device such as a touch screen, for example, may function as both the data entry module 508 and the display 532. External display devices may also be connected to the bus 514 via an external display interface 534. Other peripheral output devices, not shown, such as speakers and printers, may be connected to the hardware device 500.

The hardware device 500 may operate in a networked environment using logical connections to one or more remote nodes (not shown) via the communication interface 512. The remote node may be another computer, a server, a router, a peer device or other common network node, and typically includes many or all of the elements described above relative to the hardware device 500. The communication interface 512 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 512 may include logic configured to support direct memory access (DMA) transfers between the memory 504 and other devices.

In a networked environment, program modules depicted relative to the hardware device 500, or portions thereof, may be stored in a remote storage device, such as, for example, on a server. It will be appreciated that other hardware and/or software to establish a communications link between the hardware device 500 and other devices may be used.

It should be understood that the arrangement of the hardware device 500 illustrated in FIG. 5 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 500.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 5.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for linking backup files based on data partitions, the system comprising:
a processor-based application, which when executed on a computer, will cause the processor to:
identify a first data partition and a second data partition in a full backup file created at a first time for a dataset by tagging the full backup file with the first data partition and the second partition;
identify a revision of the first data partition in a first incremental backup file created at a second time for the dataset by tagging the first incremental backup file with the first data partition;
link the first incremental backup file to the full backup file based on the first data partition and the revision of the first data partition;
identify a revision of the second data partition in a second incremental backup file created at a third time for the dataset by tagging the second incremental backup file with the second partition;
link the second incremental backup file to the full backup file based on the second data partition and the revision of the second data partition; and
restore the second data partition in the dataset based on the link from the second incremental backup file to the full backup file, in response to receiving a request to restore the second data partition in the dataset.

2. The system of claim 1, wherein restoring the second data partition in the dataset comprises combining only the revision of the second data partition from the second incremental backup file and the second data partition from the full backup file.

3. The system of claim 1, wherein the processor-based application further causes the processor to restore the first data partition in the dataset based on the link from the first incremental backup file to the full backup file, in response to receiving a request to restore the first data partition in the dataset.

4. The system of claim 1, wherein the processor-based application further causes the processor to:
identify a second revision of the first data partition in a third incremental backup file created at a fourth time for the dataset; and
link the third incremental backup file to the first incremental backup file based on the second revision of the first data partition and the revision of the first data partition.

5. The system of claim 4, wherein the processor-based application further causes the processor to de-duplicate the third incremental backup file based on the link from the third incremental backup file to the first incremental backup file and the link from the first incremental backup file to the full backup file.

6. The system of claim 4, wherein the processor-based application further causes the processor to:
identify a third revision of the first data partition and a second revision of the second data partition in a a fourth incremental backup file created at a fifth time for the dataset;
link the fourth incremental backup file to the third incremental backup file based on the third revision of the first data partition and the second revision of the first data partition; and
link the fourth incremental backup file to the second incremental backup file based on the second revision of the second data partition and the revision of the second data partition.

7. A computer-implemented method for linking backup files based on data partitions, the method comprising:
identifying a first data partition and a second data partition in a full backup file created at a first time for a dataset by tagging the full backup file with the first data partition and the second data partition;
identifying a revision of the first data partition in a first incremental backup file created at a second time for the dataset by tagging the first incremental backup file with the first data partition;
linking the first incremental backup file to the full backup file based on the first data partition and the revision of the first data partition;
identifying a revision of the second data partition in a second incremental backup file created at a third time for the dataset by tagging the other incremental backup file with the second data partition;
linking the second incremental backup file to the full backup file based on the second data partition and the revision of the second data partition; and
restoring the second data partition in the dataset based on the link from the second incremental backup file to the full backup file, in response to receiving a request to restore the second data partition in the dataset.

8. The method of claim 7, wherein restoring the second data partition in the dataset comprises combining only the revision of the second data partition from the other incremental backup file and the second data partition from the full backup file.

9. The method of claim 7, wherein the method further comprises restoring the first data partition in the dataset based on the link from the first incremental backup file to the full backup file, in response to receiving a request to restore the first data partition in the dataset.

10. The method of claim 7, wherein the method further comprises:
identifying a second revision of the first data partition in a third incremental backup file created at a fourth time for the dataset; and
linking the third incremental backup file to the first incremental backup file based on the second revision of the first data partition and the revision of the first data partition.

11. The method of claim 10, wherein the method further comprises de-duplicating the third incremental backup file based on the link from the third incremental backup file to the first incremental backup file and the link from the first incremental backup file to the full backup file.

12. The method of claim 10, wherein the method further comprises:
identifying a third revision of the first data partition and a second revision of the second data partition in a fourth incremental backup file created at a fifth time for the dataset;
linking the fourth incremental backup file to the second incremental backup file based on the third revision of the first data partition and the second revision of the first data partition; and
linking the fourth incremental backup file to the second incremental backup file based on the second revision of the second data partition and the revision of the second data partition.

13. A computer program product, comprising a non-transitory computer-readable medium having a computer-readable program code embodied therein to be executed by one or more processors, the program code including instructions to:

identify a first data partition and a second data partition in a full backup file created at a first time for a dataset by tagging the full backup file with the first data partition and the second data partition;

identify a revision of the first data partition in a first incremental backup file created at a second time for the dataset by tagging the first incremental backup file with the first data partition;

link the first incremental backup file to the full backup file based on the first data partition and the revision of the first data partition;

identify a revision of the second data partition in a second incremental backup file created at a third time for the dataset by tagging the second incremental backup file with the second data partition;

link the second incremental backup file to the full backup file based on the second data partition and the revision of the second data partition; and restore the second data partition in the dataset based on the link from the second incremental backup file to the full backup file, in response to receiving a request to restore the second data partition in the dataset.

14. The computer program product of claim 13, wherein restoring the second data partition in the dataset comprises combining only the revision of the second data partition from the second incremental backup file and the second data partition from the full backup file.

15. The computer program product of claim 13, wherein the wherein the program code includes further instructions to restore the first data partition in the dataset based on the link from the first incremental backup file to the full backup file, in response to receiving a request to restore the first data partition in the dataset.

16. The computer program product of claim 13, wherein the program code includes further instructions to:

identify a second revision of the first data partition in a third incremental backup file created at a fourth time for the dataset;

link the third incremental backup file to the first incremental backup file based on the second revision of the first data partition and the revision of the first data partition; and de-duplicate the third incremental backup file based on the link from the third incremental backup file to the first incremental backup file and the link from the first incremental backup file to the full backup file.

17. The computer program product of claim 16, wherein the program code includes further instructions to:

identify a third revision of the first data partition and a second revision of the second data partition in a fourth incremental backup file created at a fifth time for the dataset;

link the fourth incremental backup file to the third incremental backup file based on the third revision of the first data partition and the second revision of the first data partition; and link the fourth incremental backup file to the second incremental backup file based on the second revision of the second data partition and the revision of the second data partition.

* * * * *